Jan. 9, 1962

G. H. DOERRIES 3,015,973

ROTARY SPEED CHANGER

Filed Nov. 25, 1960

3 Sheets-Sheet 1

INVENTOR.
GEORGE H. DOERRIES
BY *William V. Ebs*
ATTORNEY

Jan. 9, 1962 G. H. DOERRIES 3,015,973
ROTARY SPEED CHANGER
Filed Nov. 25, 1960 3 Sheets-Sheet 2

INVENTOR.
GEORGE H. DOERRIES
BY
William V. Ebs
ATTORNEY

Jan. 9, 1962  G. H. DOERRIES  3,015,973
ROTARY SPEED CHANGER
Filed Nov. 25, 1960  3 Sheets-Sheet 3

INVENTOR
GEORGE H. DOERRIES

BY *William V. Ebs*
ATTORNEY

United States Patent Office 3,015,973
Patented Jan. 9, 1962

3,015,973
ROTARY SPEED CHANGER
George H. Doerries, West Caldwell, N.J., assignor to Curtiss-Wright Corporation, a corporation of Delaware
Filed Nov. 25, 1960, Ser. No. 71,560
9 Claims. (Cl. 74—801)

My invention relates to rotary speed changers of high torque capacity having planetary gear elements in multiple shear wherein loads are balanced to eliminate tipping and corner loading of such planetary gear elements. The device of the invention is of the type disclosed in Patent No. 2,944,444 for "Rotary Speed Reducers," issued July 12, 1960, to William E. Burns and assigned to the same assignee as the present invention.

In certain applications for rotary speed reducers of the type mentioned it is desirable to provide hollow shaft space within the device for the accommodation of an element or elements to operate independently of the speed reducer. An example of such an application occurs in the case of vertical take-off and landing aircraft having tiltable propellers, rotors or ducted fans at the ends of fixed airfoils where the propellers, rotors or fans are each controlled in respect to angle of tilt by a high speed shaft acting through a rotary speed reducer, and design considerations dictate that the propellers, rotors or fans be rotated by drive shafts extending within and through both the airfoils and rotary speed reducers.

A prime object of this invention is to provide a speed changer of the type mentioned in which a maximum amount of hollow shaft space is made available without a sacrifice in speed changing capabilities of the device.

Figure 1:
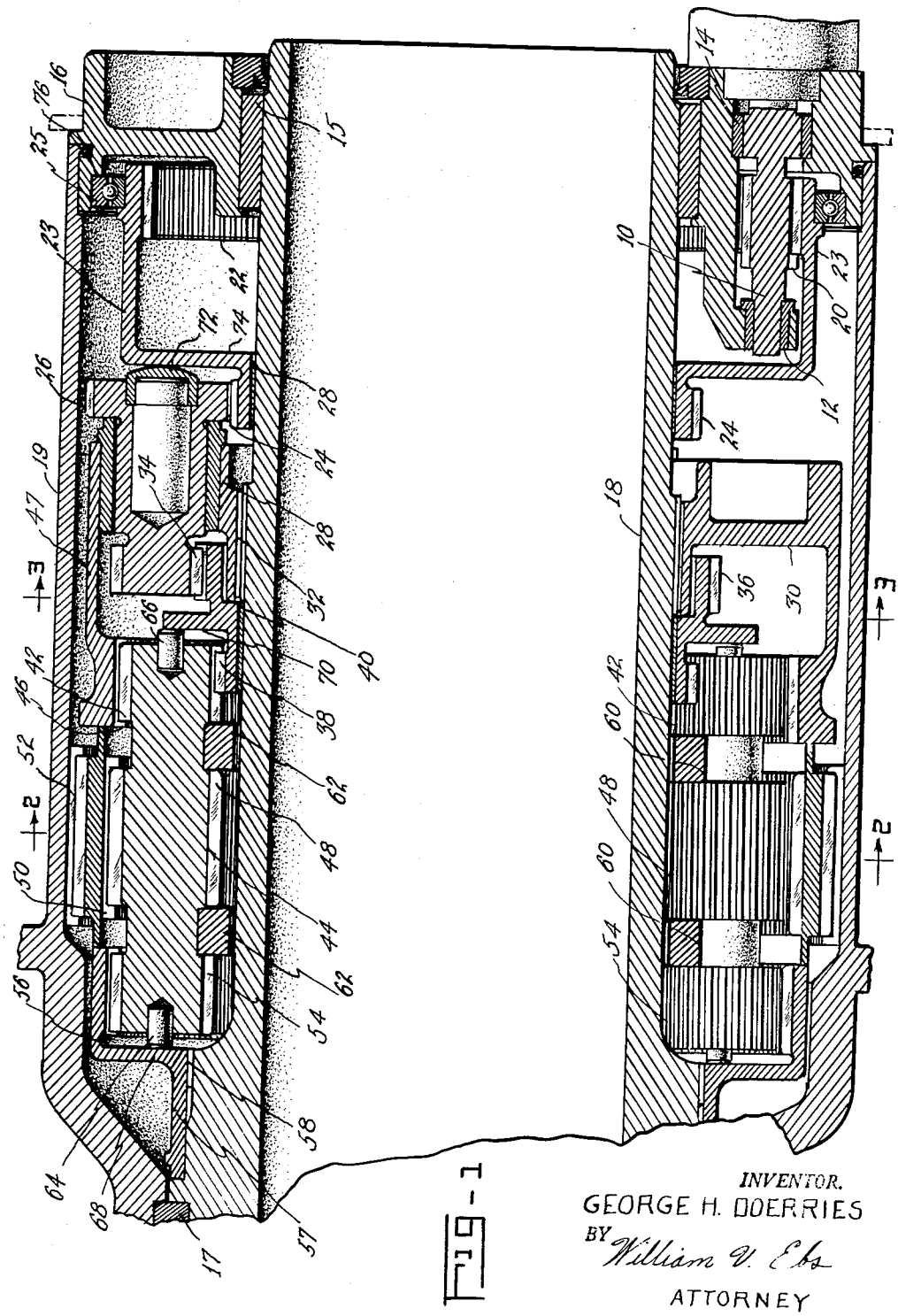
Figure 2:
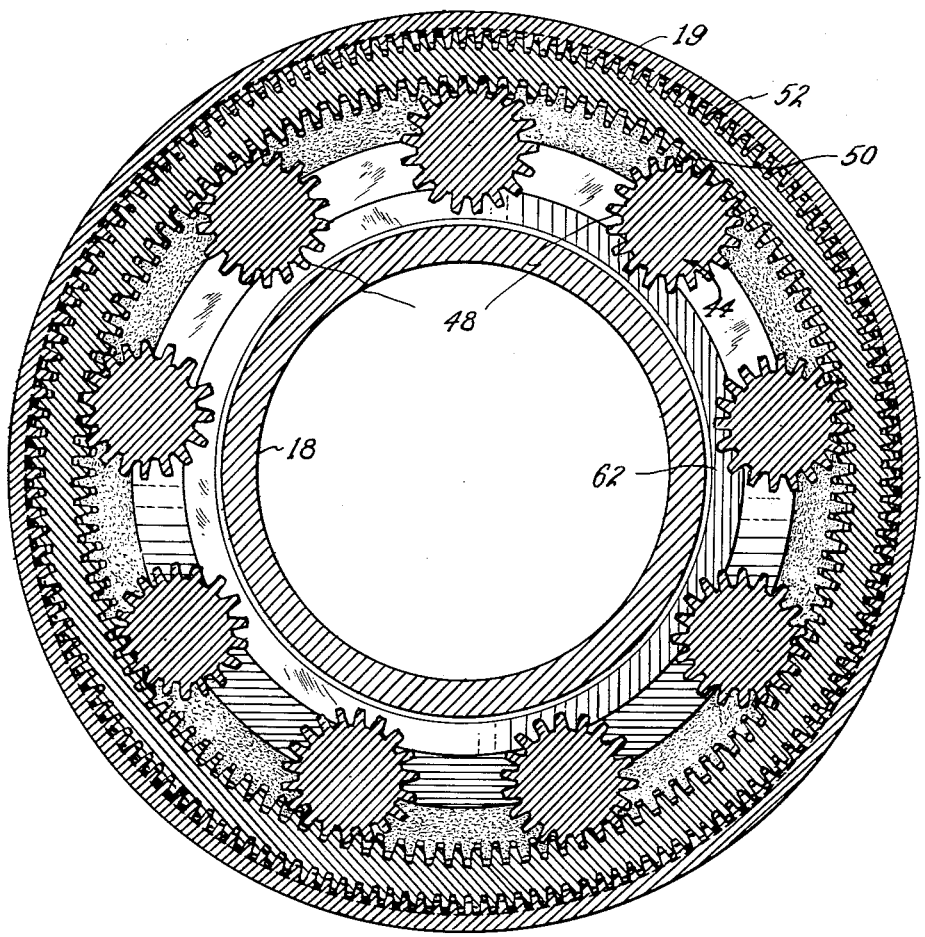
Figure 3:
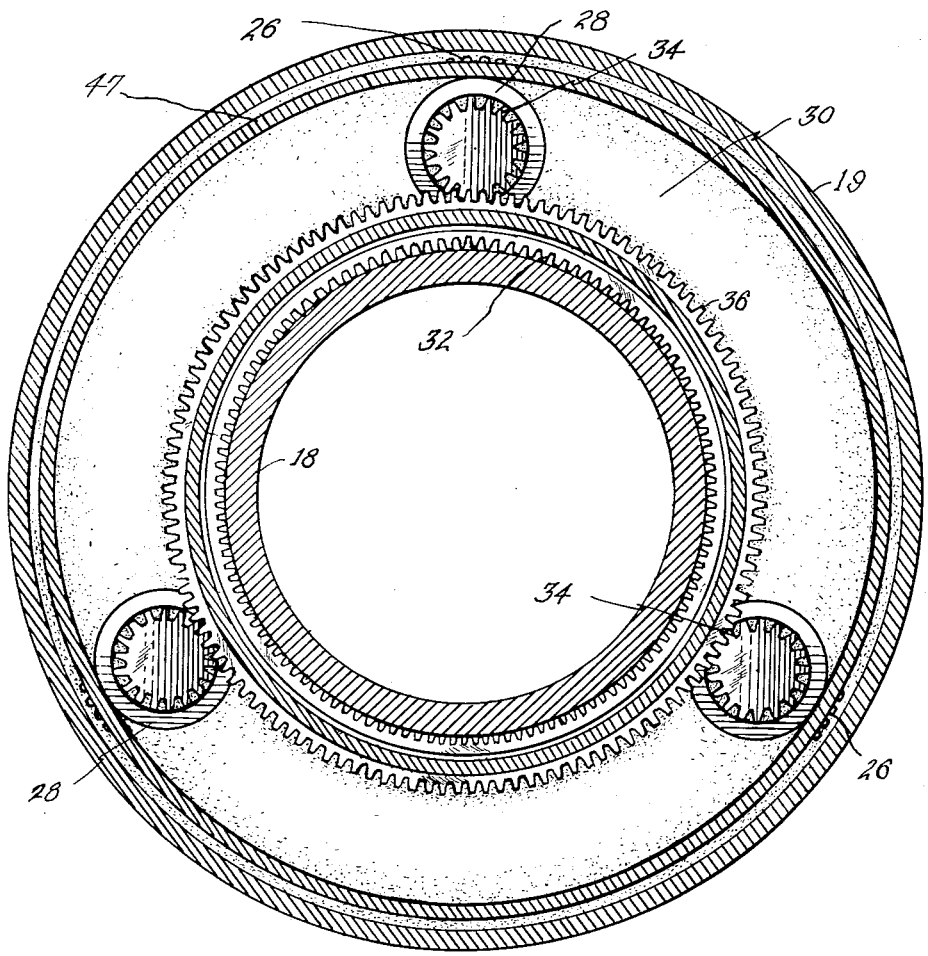

Other objects and advantages of the invention become apparent during a reading of the specification taken in connection with the accompanying drawings in which:

FIG. 1 is a vertical longitudinal sectional view taken through the speed changer of the invention, FIG. 2 is a cross sectional view of the device taken on the plane of the line 2—2 of FIG. 1, FIG. 3 is a cross sectional view taken on the plane of the line 3—3 of FIG. 1.

Referring to the drawings, reference character 10 designates a high speed shaft which may as a matter of convenience be considered to be the input shaft of the speed changer of the invention. The shaft 10 is rotatably supportable within the device in bushings 12 and 14 mounted in a portion of end cover 16. Shaft 10 is located outside of the confines of hollow low speed shaft 18 of the speed changer as are all other functional elements of the mechanism. This arrangement provides the maximum amount of hollow shaft space devoid of operating elements within the device. Although hollow, low speed shaft 18 is made stronger and stiffer than the input shaft since at low speed it is required to carry high torsional load. Low speed shaft 18 may be conveniently considered to be the output shaft of the speed changer. As shown, shaft 18 is rotatably mounted on bushings 15 and 17 respectively disposed between the shaft and end cover 16, and between the shaft and the housing 19 of the device.

The high speed input shaft 10 is drivably connected through a pinion 20 mounted thereon with an internal ring gear 22. Ring gear 22 is an integral part of structure 23 which also includes external ring gear 24. The gears 22 and 24 are rotatably supported by ball bearing 25 disposed between a portion of end cover 16 and structure 23, and by bushing 28 located between shaft 18 and structure 23. External ring gear 24 drivably engages a plurality of transfer gears 26 which are rotatably mounted in bushings 28. The bushings 28 are rotationally secured in a cage 30 which is splined at 32 to the output shaft 18. The transfer gears 26 include as integral parts thereof, pinions 34 which engage external ring gear 36. External ring gear 36 is integral with external ring gear 38 and both gears 36 and 38 are rotatably mounted on bushing 40 surrounding low speed shaft 18.

Gear 38 engages a plurality of pinions 42 each on a planetary member 44. The pinions 42 engage internal ring gear 46 which is integrally connected by structure 47 with transfer gear cage 30. The planetary members 44 each include a pinion 48 in engagement with an internal ring gear 50 which is splined at 52 to the fixed housing 19 of the speed changer. A third pinion 54 on each of the planetary members engages a ring gear 56 which is integral with structure 57 splined as at 58 to the low speed shaft 18. Pinions 42 and 54 are of the same diameter and have the same number of teeth but pinion 48 is of a different diameter and has a different number of teeth. Between the pinions 42 and 54 which have a circular pitch corresponding to the circular pitch of respective internal gears 46 and 56, cylindrical annular portions 60 are formed, either reduced in diameter relative to the pinions as shown or somewhat larger in diameter whereby beam strength of the planet members 44 may be improved.

Preferably, planetary members 44 are not caged in a spider but rather, the pinions of these members are held in proper engagement with their meshing ring gears through the use of stiff springs 62 concentric with the axis of rotation of shaft 18 and engaging the cylindrical portions 60 on the planetary members. The planetary members 44 are in this manner held in firm engagement with the internal gears and are free to find those precise positions when load is being carried by which torque load is evenly distributed circumferentially between the planet members in their engagement with the ring gears. Since fixed ring gear 50 lies between similar gears 46 and 56, cocking of the planet members 44 is minimized and equal torque loads are imposed on the gears 46 and 56. The moving parts are restricted to definite axial positions by means of the bosses 64 and 66 which respectively engage flanges 68 and 70, by boss 72 in engagement with the flange 74, and by the bearing 25 which abuts the flange 76 on the end cover 16. Fixed ring gear 50 is axially confined between ring gear 56 and structure 47.

When the shaft 10 rotates, transfer gears 26 are driven through the driving connections including engaged gears 20, 22 and the engaged gears 24 and 26. The transfer gears are caused to rotate and their rotation in turn imparts rotation to the planetary members 44 through engaged gears 34, 36 and 38, 42. The planetary members rotate within and relative to the gears 46, 50 and 56. Due to the tooth number difference between the gears 46, 56 and gear 50 and the meshing planetary pinions, gears 46 and 56 are caused to rotate slowly with respect to fixed internal gear 50, this slow rotation being imparted to low speed output shaft 18 which as noted hereinbefore is rotationally fixed relative to the gears 46 and 56. This slow rotation is also imparted to cage 30 which rotation has only a slight effect upon the ratio of the system due to the high reduction ratio inherent in it. A change in ratio due to the orbiting of transfer gears 34 is readily calculable in designing the system to obtain a specific speed ratio between input and output shafts. The transfer gears 34 permit the output shaft to rotate continuously in either direction in response to continuous rotation of the input shaft 10.

Although various elements have been identified in the foregoing description as input, output and fixed elements to facilitate understanding of the relationship of the functioning parts, it will be understood that variations may be made as to which of the elements are fixed and which are input or output. The gearing, although inherently of high ratio, is reversible and any one of the shafts 10 or 18 or gear 50 may constitute input, output or fixed elements.

It will be clear to those skilled in the art that various changes and modifications may be made in the mechanism shown and described without departing from the spirit and scope of the invention. The appended claims are intended to cover all such changes and modifications.

I claim:

1. A high ratio speed changer comprising a hollow, low speed shaft, a high speed shaft outside the confines of the low speed shaft, a plurality of rotatably mounted transfer gears surrounding the low speed shaft and drivably connected to the high speed shaft, bearing means for said transfer gears mounted on the low speed shaft to prevent rotational movement of the low speed shaft relative to the bearing means, a plurality of planetary members around the low speed shaft, means drivably connecting the planetary members and the transfer gears, fixed structure, gears having different numbers of teeth on each planetary member, and other gears connected to the bearing means and fixed structure in mesh with the gears on each of the planetary members.

2. A high ratio speed changer as defined in claim 1 including resilient ring means surrounding the low speed shaft and in forced contact with the planetary members for holding the planetary and meshing gears in firm engagement.

3. A high ratio speed changer comprising a hollow low speed shaft, a high speed shaft outside the confines of said low speed shaft, a plurality of rotatably mounted transfer gears surrounding the low speed shaft and drivably connected to the high speed shaft, bearing means for said transfer gears mounted on the low speed shaft to prevent rotational movement of the low speed shaft relative to the bearing means, a plurality of planetary members around the low speed shaft, means drivably connecting the planetary members and the transfer gears, fixed structure, a pair of gears with the same number of teeth on each planetary member, a third gear with a different number of teeth on the planetary member, other gears respectively connected to the low speed shaft, the bearing means and fixed structure, each of said other gears being in mesh with a different gear on each of the planetary members.

4. A high ratio speed changer comprising a hollow low speed shaft, a ring gear coaxial with and surrounding the low speed shaft, a high speed shaft outside the confines of said low speed shaft, a pinion on the high speed shaft in engagement with said ring gear, a plurality of rotatably mounted transfer gears surrounding the low speed shaft, a gear rotatable with the ring gear in engagement with the transfer gears, bearing means for said transfer gears mounted on the low speed shaft to prevent rotational movement of the low speed shaft relative to the bearing means, a plurality of planetary members around the low speed shaft, another ring gear surrounding the low speed shaft rotatable by said transfer gears and drivably connected to the planetary members, fixed structure, gears having different numbers of teeth on each planetary member, and other gears connected to the bearing means and fixed structure in mesh with the gears on each of the planetary members.

5. A high ratio speed changer as defined in claim 4 including means for preventing the ring gears, planetary members and transfer gears from moving longitudinally on their axes of rotation.

6. A high ratio speed changer comprising a housing, a hollow low speed shaft within the housing, a high speed shaft between the low speed shaft and housing, a plurality of rotatably mounted transfer gears between the low speed shaft and housing drivably connected to the high speed shaft, bearing means for said transfer gears mounted on the low speed shaft to prevent rotational movement of the low speed shaft relative to the bearing means, a plurality of planetary members between the low speed shaft and housing drivably connected to the transfer gears, gears having different numbers of teeth on each planetary member, and other gears connected to the bearing means and housing in mesh with the gears on the planetary members.

7. A high ratio speed changer as defined in claim 6 wherein said other gears are internal ring gears, and the speed changer includes resilient ring means between the low speed shaft and said planetary members in forced contact with the planetary members for holding the planetary gears and said other gears in firm engagement.

8. A high ratio speed changer comprising a housing, a hollow low speed shaft within the housing, a high speed shaft between the low speed shaft and housing, a ring gear coaxial with the low speed shaft located between the low speed shaft and housing, a pinion on the high speed shaft in engagement with said ring gear, a plurality of rotatably mounted transfer gears between the low speed shaft and housing, a gear rotatable with the ring gear in engagement with the transfer gears, bearing means for said transfer gears mounted on the low speed shaft to prevent rotational movement of the low speed shaft relative to the bearing means, a plurality of planetary members between the low speed shaft and housing, another ring gear between the low speed shaft and housing rotatable by said transfer gears and drivably connected to the planetary members, a pair of gears with the same number of teeth on each planetary member, another gear with a different number of teeth on each planetary member located between the gears of said pair, an internal ring gear fixed with respect to the housing in mesh with said another gear of each planetary member, and a pair of internal ring gears one of which is fixedly connected with the low speed shaft and the other of which is affixed to said bearing means, said pair of internal ring gears being in mesh with the gear pairs on the planetary members.

9. A high ratio speed reducer as defined in claim 8 including resilient rings between the low speed shaft and planetary members in forced contact with the planetary members for holding the planetary and meshing gears in firm engagement.

No references cited.